(12) United States Patent
Propst et al.

(10) Patent No.: US 9,998,778 B1
(45) Date of Patent: Jun. 12, 2018

(54) COMPUTING SYSTEM WITH VIDEO-TAGGING ANOMALY DETECTION FEATURE

(71) Applicant: Tribune Broadcasting Company, LLC, Chicago, IL (US)

(72) Inventors: Scott Allan Propst, Noblesville, IN (US); Dana A. Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 165 days.

(21) Appl. No.: 14/996,757

(22) Filed: Jan. 15, 2016

(51) Int. Cl.
  *H04N 21/24* (2011.01)
  *H04N 21/845* (2011.01)
  *H04N 21/262* (2011.01)

(52) U.S. Cl.
  CPC ... *H04N 21/2407* (2013.01); *H04N 21/26258* (2013.01); *H04N 21/26283* (2013.01); *H04N 21/8455* (2013.01); *H04N 21/8456* (2013.01)

(58) Field of Classification Search
  CPC ......... H04N 21/2407; H04N 21/26258; H04N 21/26283; H04N 21/8456; H04N 21/8455
  See application file for complete search history.

(56) References Cited

U.S. PATENT DOCUMENTS

| | | | |
|---|---|---|---|
| 2007/0199040 A1* | 8/2007 | Kates | H04N 5/76 725/134 |
| 2009/0144785 A1* | 6/2009 | Walker | G11B 27/034 725/105 |
| 2011/0043536 A1* | 2/2011 | Cobb | G06K 9/00771 345/629 |
| 2016/0142783 A1* | 5/2016 | Bagga | H04N 21/47214 725/47 |
| 2017/0164060 A1* | 6/2017 | Blong | H04N 21/4826 |

* cited by examiner

*Primary Examiner* — Oleg Asanbayev
*Assistant Examiner* — Akshay Doshi
(74) *Attorney, Agent, or Firm* — McDonnell Boehnen Hulbert & Berghoff LLP (57) ABSTRACT

In one aspect, an example method includes (i) receiving, by a computing system, first data indicating a first extent of temporal portions of video content that have a particular characteristic; (ii) receiving, by the computing system, second data indicating a second extent of temporal portions of the video content that have the particular characteristic; (iii) determining, by the computing system, that the received first data lacks a threshold extent of similarity with the received second data; and (iv) responsive to determining that the received first data lacks the threshold extent of similarity with the received second data, performing, by the computing system, an action.

9 Claims, 6 Drawing Sheets

| Start Time | Start-Time Type | Duration | Description | Episode Identifier | Segment Identifier | Source Identifier | Video Content Identifier |
|---|---|---|---|---|---|---|---|
| 7:00:00:00 | Absolute | 0:08:00:00 | Sitcom A | E-7 | SG-1 | SR-1 | VC-1 |
| 7:08:00:00 | Absolute | 0:00:30:00 | Commercial A | | | SR-2 | VC-2 |
| 7:08:30:00 | Absolute | 0:00:30:00 | Commercial B | | | SR-3 | VC-3 |
| 7:09:00:00 | Absolute | 0:00:30:00 | Commercial C | | | SR-1 | VC-4 |
| 7:09:30:00 | Absolute | 0:00:30:00 | Commercial D | | | SR-2 | VC-5 |
| 7:10:00:00 | Absolute | 0:08:00:00 | Sitcom A | E-7 | SG-2 | SR-3 | VC-6 |
| 7:18:00:00 | Absolute | 0:00:30:00 | Commercial E | | | SR-1 | VC-7 |
| 7:18:30:00 | Absolute | 0:00:30:00 | Commercial F | | | SR-2 | VC-8 |
| 7:19:00:00 | Absolute | 0:00:30:00 | Commercial G | | | SR-3 | VC-9 |
| 7:19:30:00 | Absolute | 0:00:30:00 | Commercial H | | | SR-1 | VC-10 |

COMPUTING SYSTEM WITH VIDEO-TAGGING ANOMALY DETECTION FEATURE

USAGE AND TERMINOLOGY

In this disclosure, unless otherwise specified and/or unless the particular context clearly dictates otherwise, the term "a" or "an" means at least one, and the term "the" means the at least one.

BACKGROUND

Unless otherwise specified, the materials described in this section are not prior art to the claims in this disclosure and are not admitted to be prior art by inclusion in this section.

A video-broadcast system (VBS) can generate and/or broadcast video content. The VBS can include various components to facilitate this. For example, the VBS can include a scheduling system, which can create and/or edit a broadcast schedule, perhaps based on input received from a user via a user interface. Further, the VBS can include an automation system, which can process records in the broadcast schedule, and based on the processed records, control one or more components of the VBS to facilitate generating and/or broadcasting the video content.

SUMMARY

In a first aspect, a method is disclosed. The method includes (i) receiving, by a computing system, first data indicating a first extent of temporal portions of video content that have a particular characteristic; (ii) receiving, by the computing system, second data indicating a second extent of temporal portions of the video content that have the particular characteristic; (iii) determining, by the computing system, that the received first data lacks a threshold extent of similarity with the received second data; and (iv) responsive to determining that the received first data lacks the threshold extent of similarity with the received second data, performing, by the computing system, an action.

In a second aspect, a non-transitory computer-readable medium is disclosed. The computer-readable medium has stored thereon program instructions that upon execution by a processor, cause performance of a set of acts including (i) receiving, by a computing system, first data indicating a first extent of temporal portions of video content that have a particular characteristic; (ii) receiving, by the computing system, second data indicating a second extent of temporal portions of the video content that have the particular characteristic; (iii) determining, by the computing system, that the received first data lacks a threshold extent of similarity with the received second data; and (iv) responsive to determining that the received first data lacks the threshold extent of similarity with the received second data, performing, by the computing system, an action.

In a third aspect, a computing system is disclosed. The computing system is configured for performing a set of acts including (i) receiving, by the computing system, first data indicating a first extent of temporal portions of video content that have a particular characteristic; (ii) receiving, by the computing system, second data indicating a second extent of temporal portions of the video content that have the particular characteristic; (iii) determining, by the computing system, that the received first data lacks a threshold extent of similarity with the received second data; and (iv) responsive to determining that the received first data lacks the threshold extent of similarity with the received second data, performing, by the computing system, an action.

DETAILED DESCRIPTION

I. Overview

A VBS can broadcast various types of video content. For example, a VBS can broadcast a video program, such as an episode of a syndicated television show. In some cases, rather than broadcasting the entire video program as one continuous video-content item, the VBS can separately broadcast various segments of the video program. This can allow the VBS to insert commercials or other video content in between the broadcast segments.

In some cases though, a VBS can initially receive a video program as one continuous video-content item without any segment demarcations. To allow the VBS to separately broadcast segments of the video program, the segments may need to be separately identified. A tagging terminal can help do this by generating data related to the video program and storing the generated data in a manner that associates it with the video program. In this disclosure, this process is referred to as tagging and the related data is referred to as tagging data.

In some cases, a tagging terminal can tag video content based on user input received via a user interface. This can allow a user to use the tagging terminal to scan through a video program, and provide input to the tagging terminal that allows the tagging terminal to indicate where one or more segments of the video program begin and end. The tagging terminal can indicate this in various ways.

For example, the tagging terminal can indicate where a first segment begins by indicating a time marker of an initial frame of the first segment. The time marker can represent a duration between an initial frame of the video program and the initial frame of the first segment. Likewise, the tagging terminal can indicate where the segment ends by indicating a time marker of a final frame of the first segment. The tagging terminal can then repeat this process in connection with additional segments of the video program.

Based on the tagging data, a video source of the VBS can store each segment as a separate video-content item. This can allow the video source to separately retrieve and playout a segment as desired, thereby allowing the VBS to separately output the segment. In another example, the VBS can store the entire video program as a single video-content item, but the VBS can use the tagging data to determine which portion (representing a segment) of the item to playout at a given time, thereby allowing the VBS to separately broadcast the segment.

In some instances, the tagging terminal can generate multiple sets of tagging data for the same video content, perhaps as a result of multiple users providing input to the tagging terminal.

In other instances, each of multiple tagging terminals can generate respective sets of tagging data for the same video content. This can happen under various situations. For example, in the case where multiple VBSs are geographically dispersed (e.g., across major cities), each VBS can be associated with its own local tagging terminal. For example, a first tagging terminal can be located in Los Angeles, Calif. and a second tagging terminal can be located in New York City, N.Y. In this case, the first tagging terminal can generate first tagging data for the video content, and the second tagging terminal can generate second tagging data for the video content.

An anomaly detector can then receive the first and second tagging data and can analyze the received data to determine that the first tagging data lacks a threshold extent of similarity with the second tagging data, thereby indicating that an anomaly among the first and second tagging data is present. The anomaly detector can determine this in various ways.

For example, by analyzing the tagging data, the anomaly detector can determine that the first tagging data indicates that a video program has three segments, whereas the second tagging data indicates that the video program has four segments. In another example, the anomaly detector can determine that the first tagging data and the second tagging data both indicate that a video program has three segments, but that there is a mismatch, by more than a threshold amount, in time markers for the start frame or the end frame of one of the segments.

The presence of an anomaly, such as the ones discussed above, may indicate that the first and/or second tagging data is inaccurate. In some instances, this may be due to a user having provided inaccurate input to a tagging terminal.

In response to detecting an anomaly, anomaly detector can then perform a responsive action. For example, anomaly detector can output an alert to a user via a user interface. The alert can cause a user to review tagging data for the video content, and perhaps repeat the process of tagging the video content to help ensure the accuracy of the tagging data. As another example, anomaly detector can modify a list of items where review by a user may be warranted. The anomaly detector can modify this list by adding a record corresponding to the received first data to the list, for instance. The anomaly detector can then output the modified list via a user interface. This can also cause a user to review tagging data for the video content. As another example, based on the tagging data, the anomaly detector can make a best guess estimate of what the tagging data should be, and can modify the tagging data accordingly.

II. Example Architecture

A. Computing Device

Figure 1:
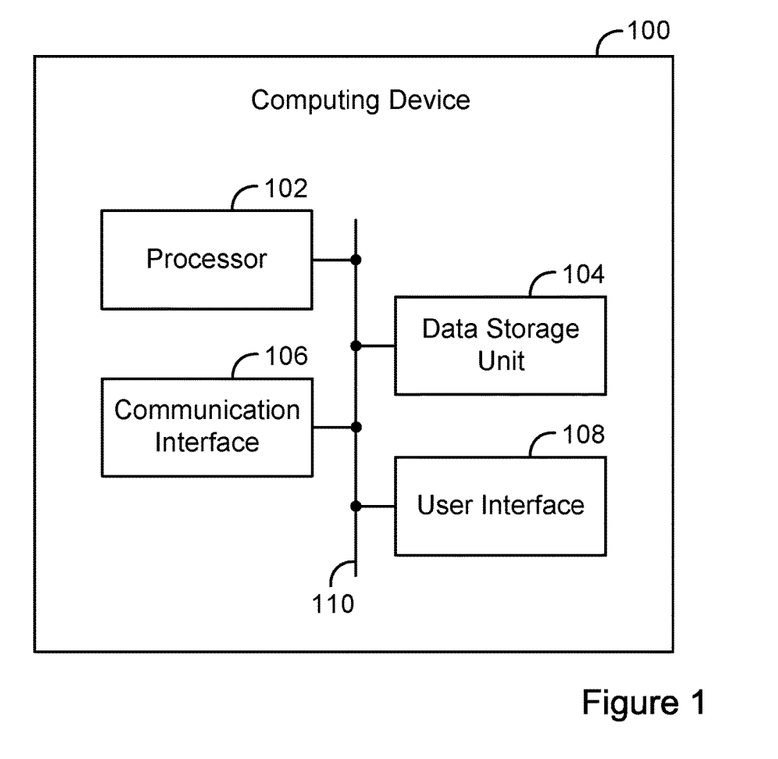
FIG. 1 is a simplified block diagram of an example computing device.

FIG. 1 is a simplified block diagram of an example computing device 100. Computing device 100 can perform various acts and/or functions, such as those described in this disclosure (including the accompanying drawings). Computing device 100 can include various components, such as processor 102, data storage unit 104, communication interface 106, and/or user interface 108. These components can be connected to each other (or to another device, system, or other entity) via connection mechanism 110.

In this disclosure, the term "connection mechanism" means a mechanism that facilitates communication between two or more devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation terminal, a desktop computer, a laptop, a tablet, and/or a mobile phone.

B. Video-Broadcast System

Figure 2:
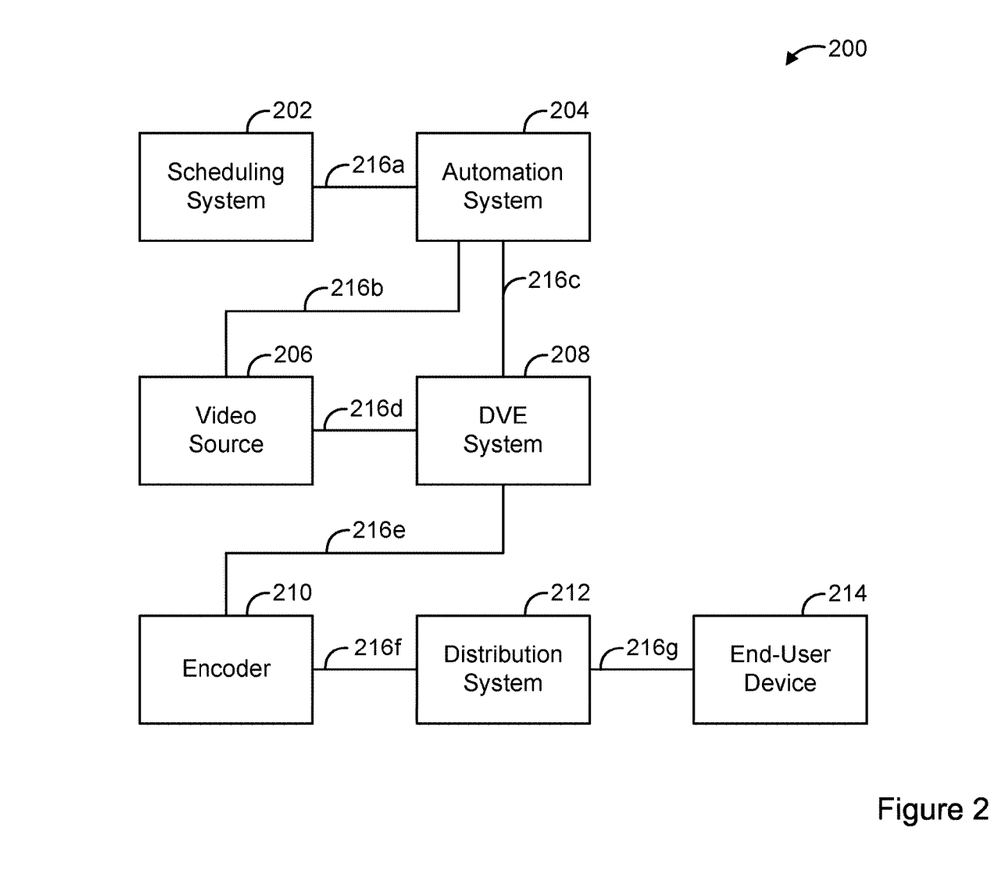
FIG. 2 is a simplified block diagram of an example VBS.

FIG. 2 is a simplified block diagram of an example VBS 200. VBS 200 can be implemented as a computing system. In this disclosure, the term "computing system" means a system that includes at least one computing device. In some instances, a computing system can include one or more other computing systems.

VBS 200 can perform various acts and/or functions related to video content. For example, VBS 200 can receive, generate, and/or transmit video content. In this disclosure, the act of receiving, generating, and/or transmitting content can occur in various ways and/or according to various standards. For example, the act of receiving and/or transmitting video content can include receiving and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, and/or transmitting video content can include receiving, generating, and/or transmitting an encoded or decoded version of the video content.

VBS 200 can include various components, such as scheduling system 202, automation system 204, video source 206, DVE system 208, encoder 210, distribution system 212, and end-user device 214, each of which can be implemented as a computing system.

VBS 200 can also include connection mechanisms 216a, which connects scheduling system 202 with automation system 204; connection mechanisms 216b, which connects automation system 204 with video source 206; connection mechanisms 216c, which connects automation system 204 with DVE system 208; connection mechanisms 216d, which connects video source 206 with DVE system 208; connection mechanisms 216e, which connects DVE system 208 with encoder 210; connection mechanisms 216f, which connects encoder 210 with distribution system 212; and connection mechanisms 216g, which connects distribution system 212 with end-user device 214.

Scheduling system 202 can perform various acts and/or functions related to scheduling and/or managing video content for broadcast. For example, scheduling system 202 can create and/or edit a broadcast schedule, perhaps based on input received from a user (e.g., a schedule manager) via a user interface. A scheduling system is sometimes referred to in the industry as a traffic system. Likewise, a broadcast schedule is sometimes referred to in the industry as a traffic log and a schedule manager is sometimes referred to in the industry as a traffic manager.

Automation system 204 can process records in the broadcast schedule. Based on the processed records and/or other information (e.g., input received from a user via a user interface), automation system 204 can control one or more other components of VBS 200 to facilitate VBS 200 performing various acts and/or functions, such as generating and transiting video content. For example, based on a broadcast schedule, automation system 204 can control video source 206 and/or DVE system 208.

A broadcast schedule serves as a schedule or outline of video content for broadcast, which can be conceptually divided into multiple logically-separated video-content items. In one example, a video-content item can be a program segment, which can be a temporal portion of a video program. A video program can be, for example, an episode of a syndicated television show or a television show being broadcast live. In another example, a video-content item can be a commercial or a promotion for a video program.

Each record of a broadcast schedule can correspond to an event that involves playout of a respective video-content item. Further, each record can include various attributes, such as a start time, a start-time type, a duration, a description, an episode identifier, a segment identifier, a source identifier, and/or a video-content identifier. Each of these attributes can be stored in a corresponding field of the record.

The start-time indicates when the corresponding event is scheduled to occur. The start-time type indicates how and/or when the start time is determined. The start-time type can be absolute, calculated, or manual. An absolute start-time type indicates that the start time is a fixed time that automation system 204 can determine before automation system 204 processed any records in the broadcast schedule are processed. An absolute start time is sometimes referred to in the industry as a hard start time. A calculated start-time type indicates that the start time is when the automation system completes the event that corresponds with an earlier record in the broadcast schedule. Automation system 204 can determine this after automation system 204 determines the start time and the duration of the previous record in the broadcast schedule. A manual start-time type indicates that the start time is when automation system 204 receives an instruction, perhaps from a user via a user interface. Accordingly, automation system 204 can determine the start time at the time the instruction is received.

The duration is a duration of the corresponding event. For example, where the event involves playout of an eight-minute program-segment, the duration is eight minutes.

The description is a description of the corresponding event. For example, where the event involves playout of a program segment, the description can be a title of the corresponding video program. As another example, where the event involves playout of a commercial, the description can be a title of the commercial.

Where applicable, the episode identifier identifies the episode and/or season of the corresponding program segment. Likewise, where applicable, the segment identifier identifies the segment of the corresponding program segment.

The source identifier identifies a video source that is used in connection with the corresponding event. For example, where the event involves playout of a stored program segment (e.g., in the form of a file), the source identifier can identify a video server that is scheduled to use the stored program segment to playout the program segment.

The video-content identifier identifies a video-content item that is scheduled to be used in connection with the corresponding event. For example, where the event involves playout of a stored program segment, the video-content identifier can identify a file location in a data storage unit where the program segment is stored. A video-content identifier is sometimes referred to in the industry as a house identifier.

In some instances, automation system 204 or another entity may be unable to determine an attribute of a record of a broadcast schedule until after a particular event occurs, such as automation system 204 processing one or more records of the schedule. After automation system 204 determines the attribute, automation system 204 can edit the broadcast schedule such that it includes the determined attribute. In one example, this can occur while VBS 200 is broadcasting a video-content item referenced in the schedule.

Figure 3:
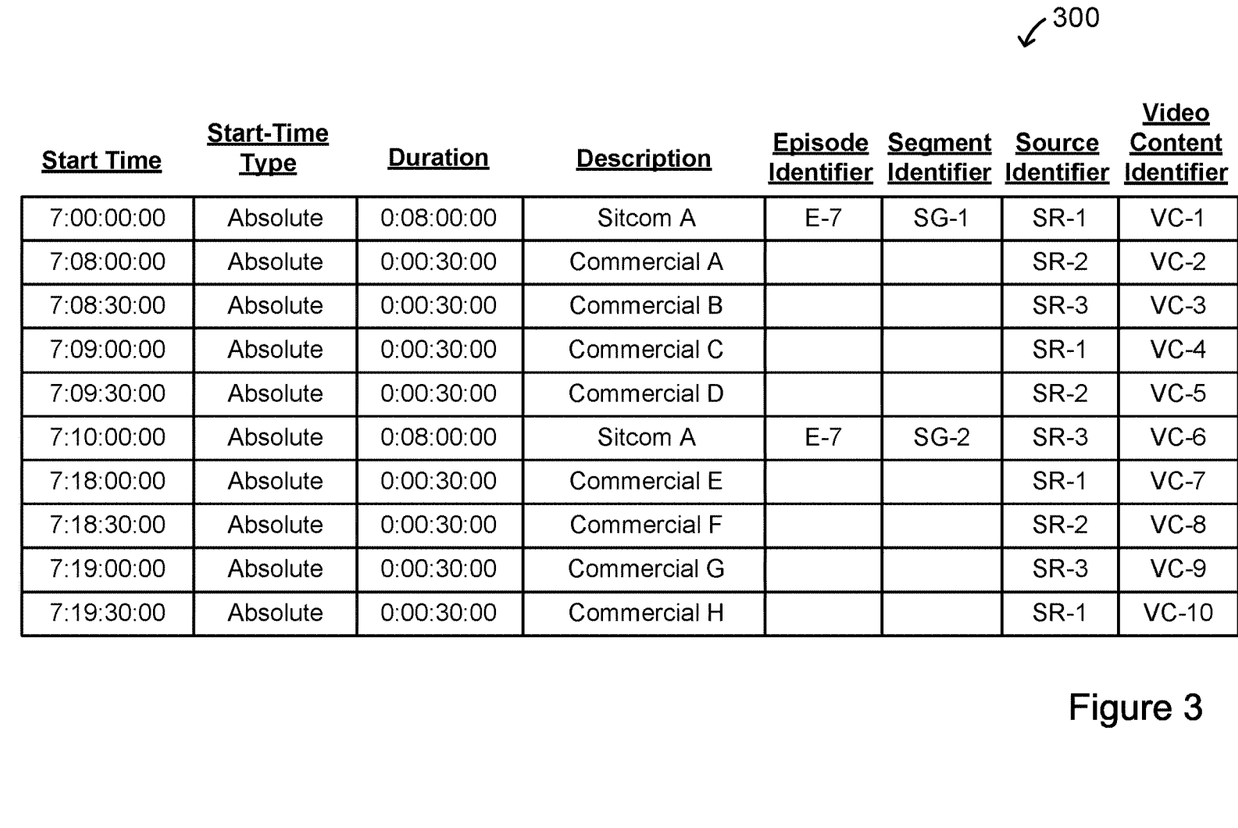
FIG. 3 is a simplified block diagram of an example broadcast schedule.

FIG. 3 is a simplified diagram of an example broadcast schedule 300. Broadcast schedule 300 includes ten records represented as ten ordered rows. Each record corresponds to a respective event and includes one or more of the attributes described above. For example, the first record specifies a start time of 7:00:00:00 (in this disclosure, times are shown in [hours]:[minutes]:[seconds]:[frames] format), a start-time type of absolute, a duration of 0:08:00:00, a description of Sitcom A, an episode identifier of E-7, a segment identifier of SG-1, a source identifier of SG-1 (which can, for example, identify video source 206), and a video-content identifier of VC-1.

It should be noted that broadcast schedule 300 has been greatly simplified for the purposes of illustrating certain features. In practice, a broadcast schedule is likely to include significantly more data.

Video source 206 can generate and/or transmit video content. In one example, video source 206 can transmit video content to DVE system 208. Video source 206 can take various forms, such as a video server, a satellite receiver, or a character generator (CG).

A video server can store a video content (e.g., in the form of a file). Further, the video server can use the stored video content to generate a video stream representing the video content. This is sometimes referred to in the industry as the video server playing out the video content. The video server can then transmit the video stream, thereby transmitting the video content. An example video server is the K2 server provided by Grass Valley™ of San Francisco, Calif.

DVE system 208 can receive, generate, and/or transmit video content. In one example, DVE system 204 can receive video content from video source 206 and can transmit video content to encoder 210. DVE system 204 can also execute a DVE, which can cause DVE system 204 to generate video content.

In one example, DVE system 208 can receive first video content, and can execute a DVE, which causes DVE system 208 to generate second video content by modifying the first video content. As such, DVE system 208 can generate video content by modifying other video content.

DVE system 208 can modify video content in various ways, such as by overlaying text, images, video, or other content thereon. For example, DVE system 208 can modify video content by overlaying, on a lower right-hand corner region of the video content, a channel logo. As another example, DVE system 208 can modify video content by overlaying, on a lower-third region of the video content, a text box including text. As another example, DVE system 208 can modify video content by scaling or re-positioning the video content or a portion thereof.

Figure 4A:
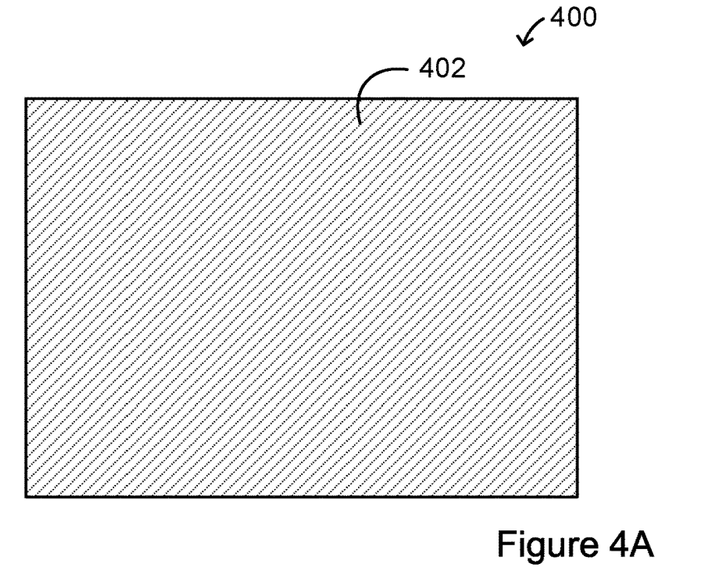
FIG. 4A is a simplified depiction of an example frame of video content, without overlaid content.
Figure 4B:
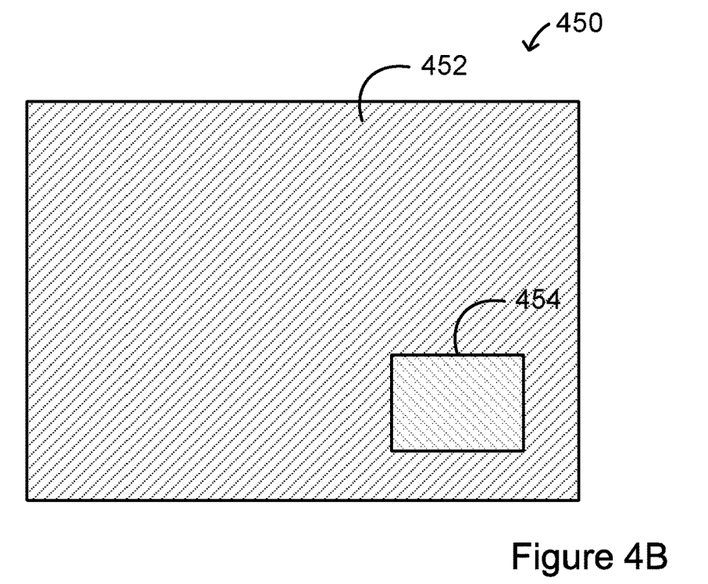
FIG. 4B is a simplified depiction of another example frame of video content, with overlaid content.

FIGS. 4A and 4B help illustrate the concept of overlaying content on video content. FIG. 4A is a simplified depiction of an example frame 400 of video content. Frame 400 includes content 402, but does not include content overlaid on content 402. For comparison, FIG. 4B is a simplified depiction of another example frame 450 of video content. Frame 450 includes content 452 and content 454 overlaid on content 452.

As noted above, DVE system 208 can execute a DVE, which causes DVE system to generate video content by modifying other video content. However, as another example, DVE system 208 can execute a DVE, which causes DVE system 208 to generate video content without modifying other video content. This type of DVE is sometimes referred to in the industry to as a full-screen DVE.

DVE system 208 can obtain content for use in connection with executing a DVE in various ways. For example, DVE system 208 can retrieve the content from a data storage unit of DVE system 208. As another example, DVE system 208 can receive the content from video source 206.

In practice, DVE system 208 can execute multiple DVEs in serial fashion. Further, in practice, VBS 200 can include multiple video sources, and each of the multiple video sources can be connected to DVE system 208, and DVE system 208 can switch between one or more inputs as appropriate, perhaps to receive and use video content in connection with DVE system 208 executing a given DVE.

DVE system 208 can also perform other acts and/or functions related to DVEs. For example, DVE system 208 can create and/or edit DVEs, perhaps based on input received from a user via a user interface. When DVE system 208 creates a DVE, DVE system 208 can generate and store corresponding program instructions for later retrieval and execution. As such, the act of DVE system 208 executing a DVE can include DVE system 208 retrieving and executing program instructions corresponding to the DVE.

DVE system 208 can take various forms, such as a stunt switcher. An example stunt switcher is the Miranda NVISION NVS5100MC provided by NVision, Inc. of Coppell, Tex.

Encoder 210 can receive video content, generate an encoded version of the video content, and/or transmit the encoded version of the video content. In one example, encoder 206 can receive the video content from DVE system 208 and can transmit the generated video content to distribution system 212.

Encoder 210 can encode video content according to various standards. For example, encoder 210 can encode video content in accordance with the MPEG 2 standard. An example of an encoder is the NetVX provided by Harris Corporation of Melbourne, Fla.

Distribution system 214 can receive and/or transmit video content. In one example, distribution system 214 can retrieve video content from encoder 210 and can transmit video content to end-user device 214 for presentation to an end-user. In practice, distribution system 212 can transmit the video content to a large number of end-user devices for presentation to a large number of end users.

In this disclosure, the term "video broadcast" means the distribution of video content by any means. As such, distribution system 212 can transmit video content to end-user device 214 in various ways, such as over-the-air or via a packet-based network such as the Internet. Distribution system 212 can include various components to facilitate this and related operations, such as a terrestrial antenna or a satellite dish, each of which can be implemented as a computing system.

End-user device 214 can receive video content, and can present the video content to an end-user via a user interface of end-user device 214. In one example, end-user device 214 can receive video content from distribution system 212.

Each of the video-based systems or devices described herein can include or be integrated with a corresponding audio-based system or device. Likewise, the video content described in this disclosure can include or be integrated with corresponding audio content.

C. Tagging System

Figure 5:
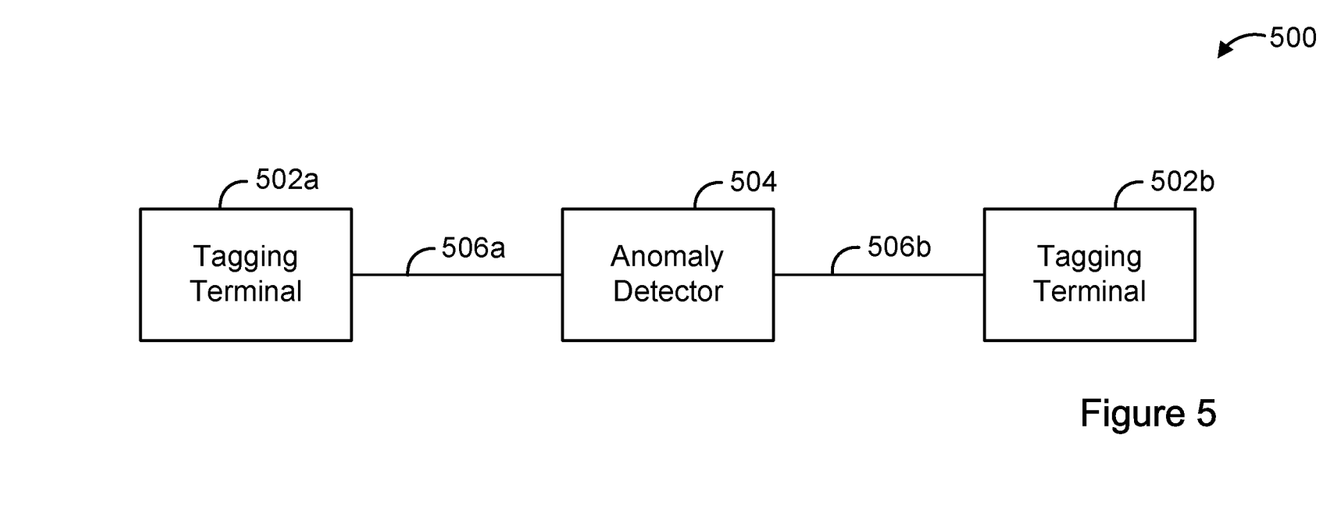
FIG. 5 is a simplified depiction of an example tagging system.

FIG. 5 is a simplified block diagram of an example tagging system 500. Tagging system 500 can include various components, such as tagging terminal 502a, anomaly detector 504, and tagging terminal 502b, each of which can be implemented as a computing system. Tagging system 500 can also include connection mechanism 506a, which connects tagging terminal 502a with anomaly detector 504; and connection mechanism 506b, which connects anomaly detector 504 with tagging terminal 502b.

Each of tagging terminals 502a and 502b can receive video content (e.g., a video program) and can generate and store associated data with the video content, perhaps based on user input received via a user interface.

Tagging video content can be useful for various reasons. As discussed above, VBS 200 can separately schedule and separately broadcast multiple program segments of a video program. This can allow VBS 200 to schedule and broadcast other video-content items (e.g., commercials) in between broadcast segments.

In some cases though, VBS 200 can initially receive a video program as one continuous video-content item without any segment demarcations. To allow VBS 200 to separately broadcast segments of the video program, the segments may need to be separately identified. Tagging terminal 502*a* can help do this by generating data related to the video program and storing the generated data in a manner that associates it with the video program (i.e., by tagging the video program).

In some cases, tagging terminal 502*a* can tag video content based on user input received via a user interface. This can allow a user to use tagging terminal 502*a* to scan through a video program, and provide input to tagging terminal 502*a* that allows tagging terminal 502*a* to indicate where one or more segments of the video program begin and end. Tagging terminal 502*a* can indicate this in various ways.

For example, tagging terminal 502*a* can indicate where a first segment begins by indicating a time marker of an initial frame of the first segment (e.g., 0:01:00:00). The time marker can represent a duration between an initial frame of the video program (or some other reference point) and the initial frame of the first segment. Likewise, tagging terminal 502*a* can indicate where the segment ends by indicating a time marker of a final frame of the first segment (e.g., 0:08:00:00). Tagging terminal 502*a* can repeat this process in connection with additional segments of the video program.

Based on the tagging data, video source 206 can store each program segment as a separate video-content item. This can allow video source 206 to separately retrieve and playout a program segment as desired, thereby allowing VBS 200 to separately broadcast the segment. In another example, video source 206 can store the entire video program as a single video-content item, but video source 206 can use the tagging data to determine which portion (representing a segment) of the item to playout, thereby allowing VBS 200 to separately broadcast the segment.

Tagging terminal 502*a* can tag video content for other reasons as well. For instance, tagging terminal 502*a* can tag a temporal portion of video content to indicate that the portion is suitable for having a DVE of the particular overlay-DVE type applied thereto. In some instances, an applied overlay DVE may cause an undesirable experience for a viewer. For instance, where a video segment includes text (e.g., opening credits of a show) in a bottom-right-corner region, and where an overlay DVE is of the type where a channel logo is overlaid on a bottom-right-corner region of video content, applying the overlay DVE to the temporal portion of the video segment may result in the logo and the text becoming jumbled, which may be distracting to a viewer.

In one example, tagging terminal 502*a* can indicate that a temporal portion of video content has a bottom-right-corner region that lacks text or other content that may interfere with content that may be overlaid thereon. As with the program segment example discussed above, in one example, tagging terminal 502*a* can tag video content in this way based on user input received via a user interface. Based on this tagging data, DVE system 208 can selectively apply a DVE to a suitable temporal portion (and not to an unsuitable temporal portion) of the video content, thereby reducing the chance of the viewer having an undesirable experience.

In some instances, 502*a* tagging terminal can generate multiple sets of tagging data for the same video content, perhaps as a result of multiple users providing input to tagging terminal 502*a*.

In other instances, each of multiple tagging terminals can generate respective sets of tagging data for the same video content. This can happen for various reasons. For example, in the case where multiple VBSs are geographically dispersed (e.g., across major cities), each VBS can have its own local tagging terminal. For example, tagging terminal 502*a* can be located in Los Angeles, Calif. and tagging terminal 502*b* can be located in New York City, N.Y. In this case, tagging terminal 502*a* can generate first tagging data for the video content, and tagging terminal 502*b* can generate second tagging data for the video content. In some instances, tagging system 500 can include additional tagging terminals that can operate in a similar manner to tagging terminals 502*a* and 502*b*.

Anomaly detector 504 can then receive the first and second tagging data, and can analyze the received data to determine that the first tagging data lacks a threshold extent of similarity with the second tagging data, thereby indicating that an anomaly among the first and second tagging data is present. Anomaly detector 504 can determine this in various ways.

For example, by analyzing the tagging data, anomaly detector 504 can determine that the first tagging data indicates that a video program has three segments, whereas the second tagging data indicates that the video program has four segments. In another example, anomaly detector 504 can determine that the first tagging data and the second tagging data both indicate that a video program has three segments, but that there is a mismatch, by more than a threshold amount (e.g., by more than three seconds), in time markers for the start frame or the end frame of one of the segments.

As another example, by analyzing the tagging data, anomaly detector 504 can determine that the first tagging data indicates that video content has three temporal portions suitable for having a DVE of a particular type applied thereto, whereas the second tagging data indicates that the video content has four of such temporal portions. In another example, anomaly detector 504 can determine that the first tagging data and the second tagging data both indicate that video content has three of such temporal portions, but that there is a mismatch, by more than a threshold amount (e.g., by more than three seconds), in time markers for the start frame or the end frame of one of the temporal portions.

The presence of an anomaly, such as the ones discussed above, may indicate that the first or second first tagging data is inaccurate. In some instances, this may be due to a user having provided inaccurate input to one or more of tagging terminals 502*a* or 502*b*.

In response to detecting an anomaly (i.e., in response to determining that the first tagging data lacks a threshold extent of similarity with the second tagging data), anomaly detector 504 can then perform a responsive action. For example, anomaly detector 504 can output an alert via a user interface. The alert can cause a user to review tagging data for the tagged video content, and perhaps repeat the process of tagging the video content to help ensure the accuracy of the tagging data. As another example, anomaly detector 504 can modify a list of items where review by a user may be warranted. Anomaly detector 504 can modify this list by adding a record corresponding to the received first data to the list, for instance. Anomaly detector 504 can then output the modified list via a user interface. This can also cause a user to review tagging data for the video content. As another example, based on the tagging data, anomaly detector 504 can make a best guess estimate of accurate tagging data, and can modify the tagging data accordingly.

In some instances, anomaly detector 504 can be integrated with one of tagging terminals 502a or 502b. Also, in some instances, tagging system 500 may include additional tagging terminals, which can also be connected to anomaly detector 504 and can operate in a manner similar to tagging terminals 502a or 502b. This can allow anomaly detector 504 to receive additional sets of tagging data from respective tagging terminals, thereby improving the ability of anomaly detector 504 to detect an anomaly and/or make a best guess estimate of accurate tagging data.

III. Example Operations

Tagging system 500 and/or components of tagging system 500 can perform various acts. These and related features will now be described.

Anomaly detector 504 can receive first data indicating a first extent of temporal portions of video content that have a particular characteristic. In one example, the particular characteristic is that the corresponding temporal portion of the video content has been identified as representing a program-segment type of content. In another example, the particular characteristic is that the corresponding temporal portion of the video content has been identified as representing a commercial type of content. In another example, the particular characteristic is that the corresponding temporal portion of the video content has been identified as representing a promotion type of content. In still another example, the particular characteristic is that the corresponding temporal portion of the video content is suitable for having a DVE of a particular DVE type applied thereto.

Anomaly detector 504 can also receive second data indicating a second extent of temporal portions of the video content that have the particular characteristic. In one example, the received first data can be generated by a VBS and the received second data can be generated by a second VBS. In some instances, the first VBS can be geographically remote from the second VBS (e.g., in another city). In this case, the first VBS can be connected with the second VBS via a wide-area network, and anomaly detector 504 can receive the second data via the wide-area network.

Anomaly detector 504 can determine that the received first data lacks a threshold extent of similarity with the received second data. Anomaly detector 504 can do this in various ways. For example, this can include anomaly detector 504 determining that there is a mismatch, by more than a threshold amount, in time markers for a frame of a temporal portion of the video content.

Responsive to determining that the received first data lacks the threshold extent of similarity with the received second data, anomaly detector 504 can perform an action. For example, anomaly detector 504 can output, via a user interface of anomaly detector 504, an alert, such as by displaying a message on display screen or sounding an audible message. As another example, anomaly detector 504 can modify a list by adding a record corresponding to the received first data to the list. Further, anomaly detector 504 can output, via a user interface of anomaly detector 504, the modified list. As another example, based on the tagging data, anomaly detector 504 can make a best guess estimate of accurate tagging data, and can modify the tagging data accordingly.

Figure 6:
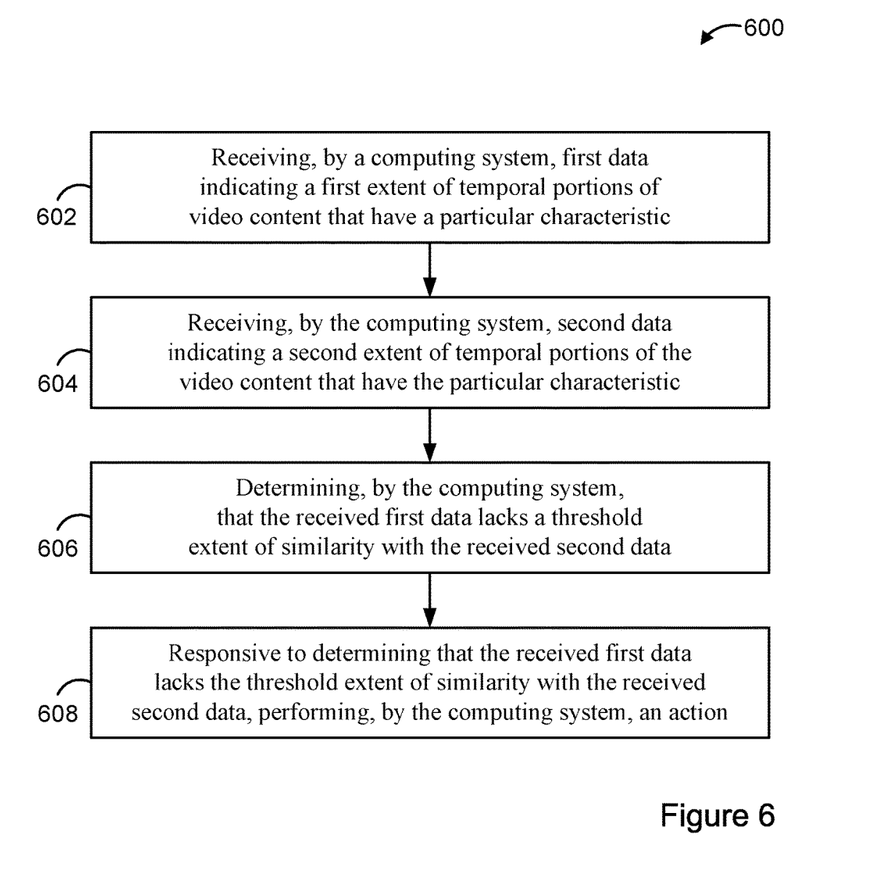
FIG. 6 is a flow chart of an example method.

FIG. 6 is a flow chart illustrating an example method 600. At block 602, method 600 can include receiving, by a computing system, first data indicating a first extent of temporal portions of video content that have a particular characteristic. At block 604, method 600 can include receiving, by the computing system, second data indicating a second extent of temporal portions of the video content that have the particular characteristic. At block 606, method 600 can include determining, by the computing system, that the received first data lacks a threshold extent of similarity with the received second data. And at block 608, method 600 can include responsive to determining that the received first data lacks the threshold extent of similarity with the received second data, performing, by the computing system, an action.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:
1. A method comprising:
   receiving, by a computing system, first tagging data indicating a first extent of temporal portions of video content that are suitable for having a digital video-effect (DVE) of a particular DVE type applied thereto, wherein the first tagging data is generated by a first video-broadcast system (VBS) via a first tagging station based on first user input received via a first user terminal;
   receiving, by the computing system, second tagging data indicating a second extent of temporal portions of the video content that are suitable for having a DVE of the particular DVE type applied thereto, wherein the second tagging data is generated by a second video-broadcast system (VBS) via a second tagging station based on second user input received via a second user terminal;
   determining, by the computing system, that the received first tagging data lacks a threshold extent of similarity with the received second tagging data;
   responsive to determining that the received first tagging data lacks the threshold extent of similarity with the received second tagging data, performing, by the com- puting system, an action, wherein performing the action comprises using the received first tagging data and the received second tagging data to generate a best guess estimate of tagging data for the video content;

using by the computing system, the generated best guess estimated tagging data to selectively apply a DVE of the particular DVE type to a temporal portion of the video content, thereby modifying the video content; and transmitting, by the computing, the modified video content to an end-user device.

2. The method of claim 1, wherein determining that the received first tagging data lacks the threshold extent of similarity with the received second tagging data comprises determining that there is a mismatch, by more than a threshold amount, in time markers for a frame of a temporal portion of the video content.

3. The method of claim 1, wherein the first VBS is connected with the second VBS via a wide-area network, and wherein receiving the second tagging data comprises receiving the second tagging data via the wide-area network.

4. A non-transitory computer-readable medium having stored thereon program instructions that upon execution by a processor, cause performance of a set of acts comprising:

receiving, by a computing system, first tagging data indicating a first extent of temporal portions of a video content that are suitable for having a digital video-effect (DVE) of a particular DVE type applied thereto, wherein the first tagging data is generated by a first video-broadcast system (VBS) via a first tagging station based on first user input received via a first user terminal;

receiving, by the computing system, second tagging data indicating a second extent of temporal portions of the video content that are suitable for having a DVE of the particular DVE type applied thereto, wherein the second tagging data is generated by a second video-broadcast system (VBS) via a second tagging station based on second user input received via a second user terminal;

determining, by the computing system, that the received first tagging data lacks a threshold extent of similarity with the received second tagging data;

responsive to determining that the received first tagging data lacks the threshold extent of similarity with the received second tagging data, performing, by the computing system, an action, wherein performing the action composes using the received first tagging data and the received second tagging data to generate a best guess estimate of tagging data for the video content;

using, by the computing system, the generated best guess estimated tagging data to selectively apply a DVE of the particular DVE type to a temporal portion of the video content, thereby modifying the video content, and transmitting, by the computing, the modified video content to an end-user device.

5. The non-transitory computer-readable medium of claim 4, wherein determining that the received first tagging data lacks the threshold extent of similarity with the received second tagging data comprises determining that there is a mismatch, by more than a threshold amount, in time markers for a frame of a temporal portion of the video content.

6. The non-transitory computer-readable medium of claim 4, wherein the first VBS is connected with the second VBS via a wide-area network, and wherein receiving the second tagging data comprises receiving the second tagging data via the wide-area network.

7. A computing system configured for performing a set of acts comprising:

receiving, by the computing system, first tagging data indicating a first extent of temporal portions of video content that are suitable for having a digital video-effect (DVE) of a particular DVE type applied thereto, wherein the first tagging data is generated by a first video-broadcast system (VBS) via a first tagging station based on first user input received via a first user terminal;

receiving, by the computing system, second tagging data indicating a second extent of temporal portions of the video content that are suitable for having a DVE of the particular DVE type applied thereto, wherein the second tagging data is generated by a second video-broadcast system (VBS) via a second tagging station based on second user input received via a second user terminal;

determining, by the computing system, that the received first tagging data lacks a threshold extent of similarity with the received second tagging data;

responsive to determining that the received first tagging data lacks the threshold extent of similarity with the received second tagging data, performing, by the computing system, an action, wherein performing the action comprises using the received first tagging data and the received second tagging data to generate a best guess estimate of tagging data for the video content;

using, by the computing system, the generated best guess estimated tagging data to selectively apply a DVE of the particular DVE type to a temporal portion of the video, content, thereby modifying the video content; and transmitting, by the computing, the modified video content to an end-user device.

8. The computing system of claim 7, wherein determining that the received first tagging data lacks the threshold extent of similarity with the received second tagging data comprises determining that there is a mismatch, by more than a threshold amount, in time markers for a frame of a temporal portion of the video content.

9. The computing system of claim 7, wherein the first VBS is connected with the second VBS via a wide-area network, and wherein receiving the second tagging data comprises receiving the second tagging data via the wide-area network.

* * * * *

UNITED STATES PATENT AND TRADEMARK OFFICE
CERTIFICATE OF CORRECTION

PATENT NO. : 9,998,778 B1  
APPLICATION NO. : 14/996757  
DATED : June 12, 2018  
INVENTOR(S) : Scott Allan Propst and Dana A. Lasher Page 1 of 1

It is certified that error appears in the above-identified patent and that said Letters Patent is hereby corrected as shown below:

In the Claims

Claim 4, Column 13, Line 48, change "composes" to --comprises--.

Signed and Sealed this
Second Day of October, 2018

Andrei Iancu
*Director of the United States Patent and Trademark Office*